March 12, 1968 W. J. BARTIK 3,373,292

SENSING CIRCUITRY

Filed Jan. 27, 1965 5 Sheets-Sheet 1

| | MATCH/NON MATCH SIG, S APP TO TER 28 | PARAMETRON 10 OSC | PARAMETRON 12 OSC | OUTPUT SIG TER 36 |
|---|---|---|---|---|
| | A | B | C | D |
| MATCH | 2f | f, PHASE π | f, PHASE π | f, PHASE π |
| NON MATCH | f, PHASE 0 | f, PHASE 0 | f, PHASE π | 0 |

INVENTOR
WILLIAM J. BARTIK

BY Fred Fisher

ATTORNEY

United States Patent Office 3,373,292
Patented Mar. 12, 1968

3,373,292
SENSING CIRCUITRY
William J. Bartik, Jenkintown, Pa., assignor to Sperry Rand Corporation, New York, N.Y., a corporation of Delaware
Filed Jan. 27, 1965, Ser. No. 428,500
4 Claims. (Cl. 307—210)

Figures 1A, 1B:
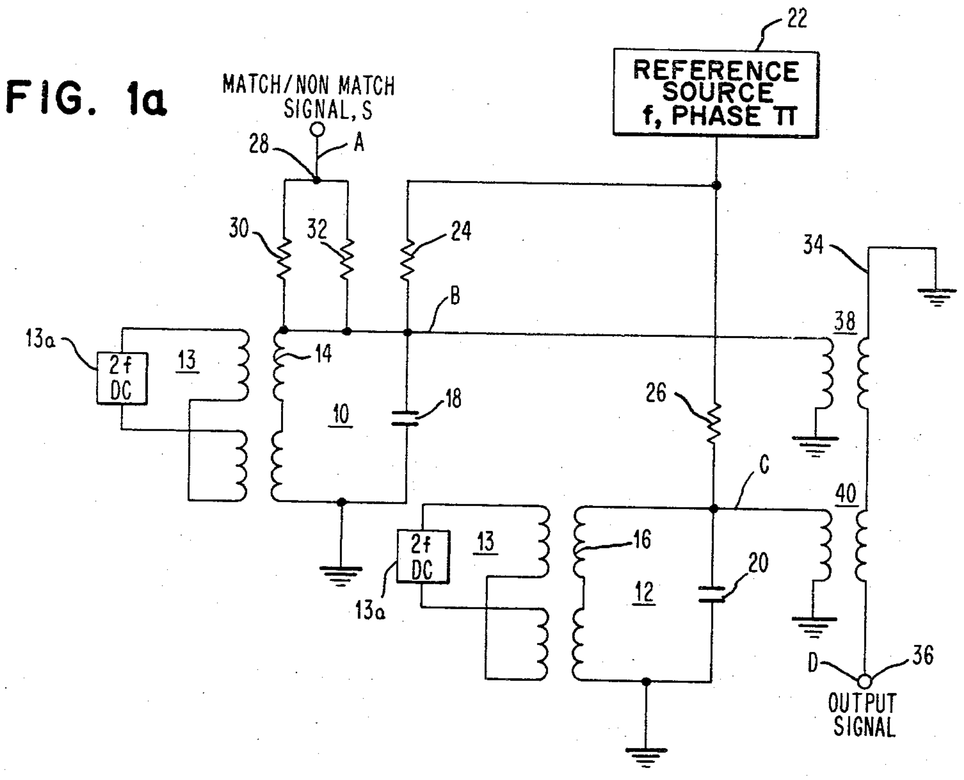

This invention relates to circuits useful in electronic data processing equipment, and, in particular, to circuits including a matrix memory wherein it is desired to search for the location of a particular word in the memory, such a search being referred to as an associative store.

An associative store consists of a search in a large memory for a particular word, the word being known but the location being unknown. Each word stored in the memory, usually, has a length of a fixed number of bits. Signals indicative of a particular word are applied to the corresponding bit lines of all the words in the memory. Upon identity of a particular word with the signal applied to all the bit lines, an output signal of a particular type is present on its corresponding word output line. The other word lines contain output signals of a different type. The output line which indicates a comparison can be a line common to a plurality of words, whereby further decoding is required. For example, one line can indicate a particular set of words along a particular row of a matrix, and another line can indicate a plurality of words along a particular column of the matrix, whereby the selection of one row and one column identifies a particular word.

This invention utilizes certain principles that are described in a copending application entitled "Magnetic Memory" filed by the same inventor and assigned to the common assignee of this application. The copending application refers to an associative store and suggests a circuit, including a plated wire memory which may be driven by parametrons, which provides an output signal at a frequency $2f$ upon a coincidence or a "match," and an output signal at the frequency $f$ when there is a "non-match" (mismatch), or lack of coincidence.

In an associative store operation, it is desirable, at times, to have the occurrence of the match condition result in the rest of the word (not being searched) to be read out, as in the case of the so-called "tag" memory. There, the tag or marker is identified and then read out with the rest of the word.

In addition, this invention finds utilization in circuits other than associative store circuits. For example, this invention finds great utility as a frequency logic circuit wherein signals at one frequency and a second frequency are transferred to signals at said second frequency and at an absence of an alternating current, respectively. Also, the invention is useful in frequency logic circuitry wherein a frequency $2f$ is representative of one binary character, and a frequency $f$ is representative of a different binary character.

It is one purpose of this invention to provide a circuit which is adapted to translate a signal at an alternating current frequency $2f$ into a signal at a frequency $f$. This circuit is further adapted to convert a signal at a frequency $f$ at a fixed phase 0 into the absence of a signal. Hence, a binary input signal can be applied to the circuitry, where the signal for one binary character is represented by a frequency $2f$ and a signal for the other binary character is represented by a frequency $f$ having a reference phase 0; the output signal is at a frequency $f$ having a phase $\pi$ rleation and an absence of any signal whatsoever, respectively.

Signal detection from a memory, and the sensing and the decoding of an associative store, are easily performed with devices which utilize a thin anisotropic magnetic film as the principal memory element. In addition, parametric circuits, similar to those referred to generally as parametrons, can be easily constructed with thin magnetic film devices.

Figure 2C:
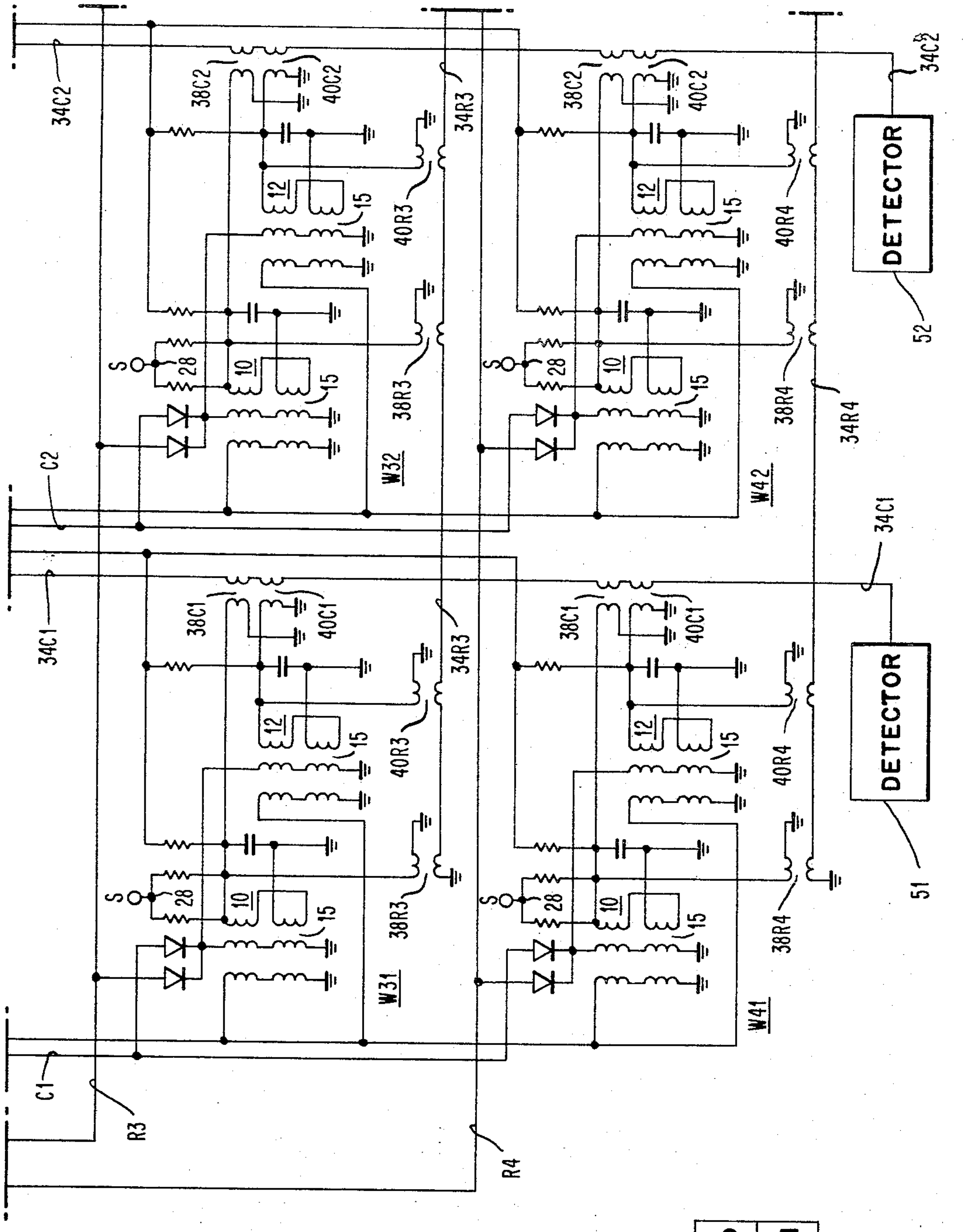
Figure 2:
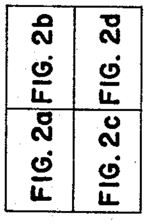
Figure 2A:
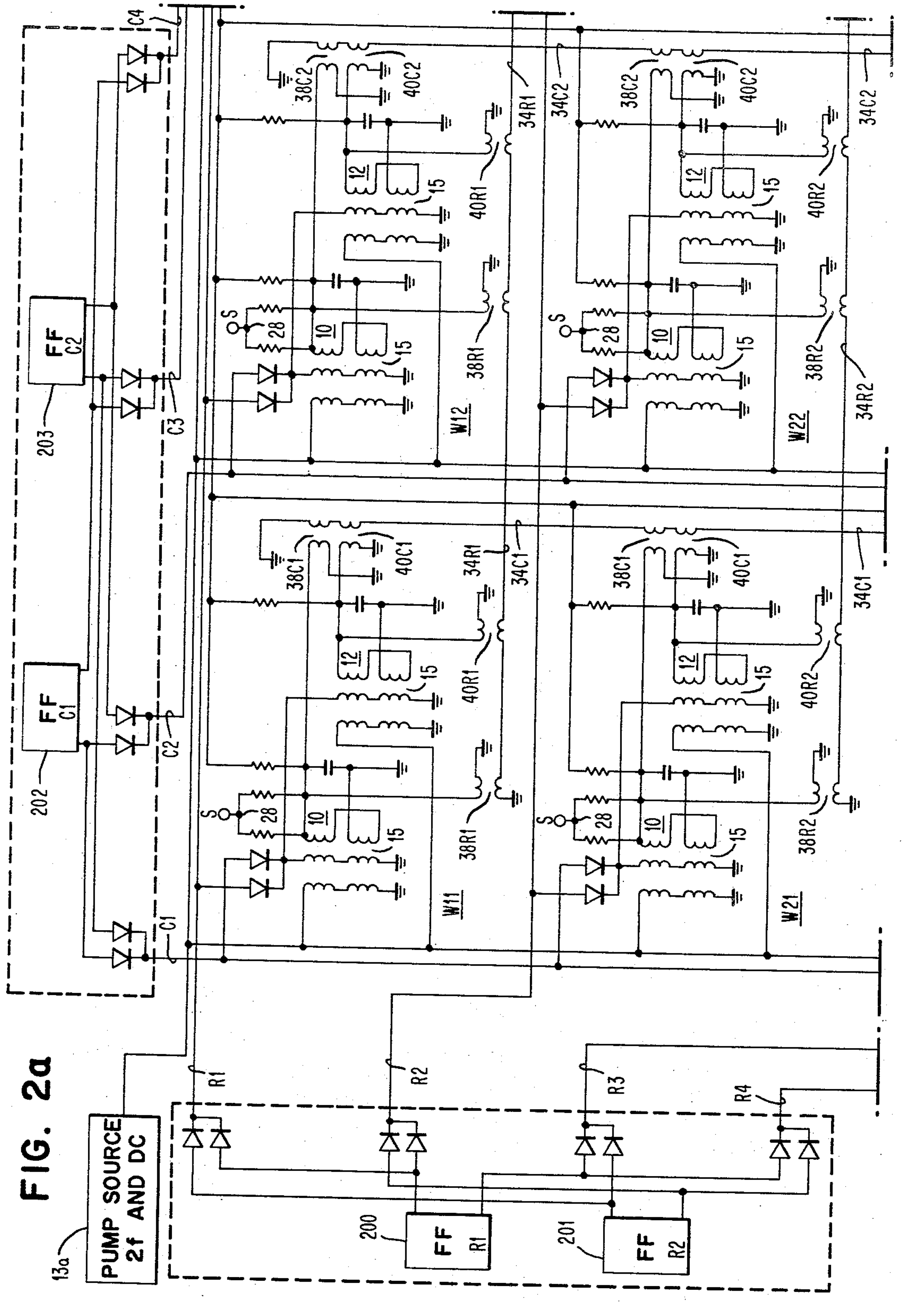
Figure 2B:
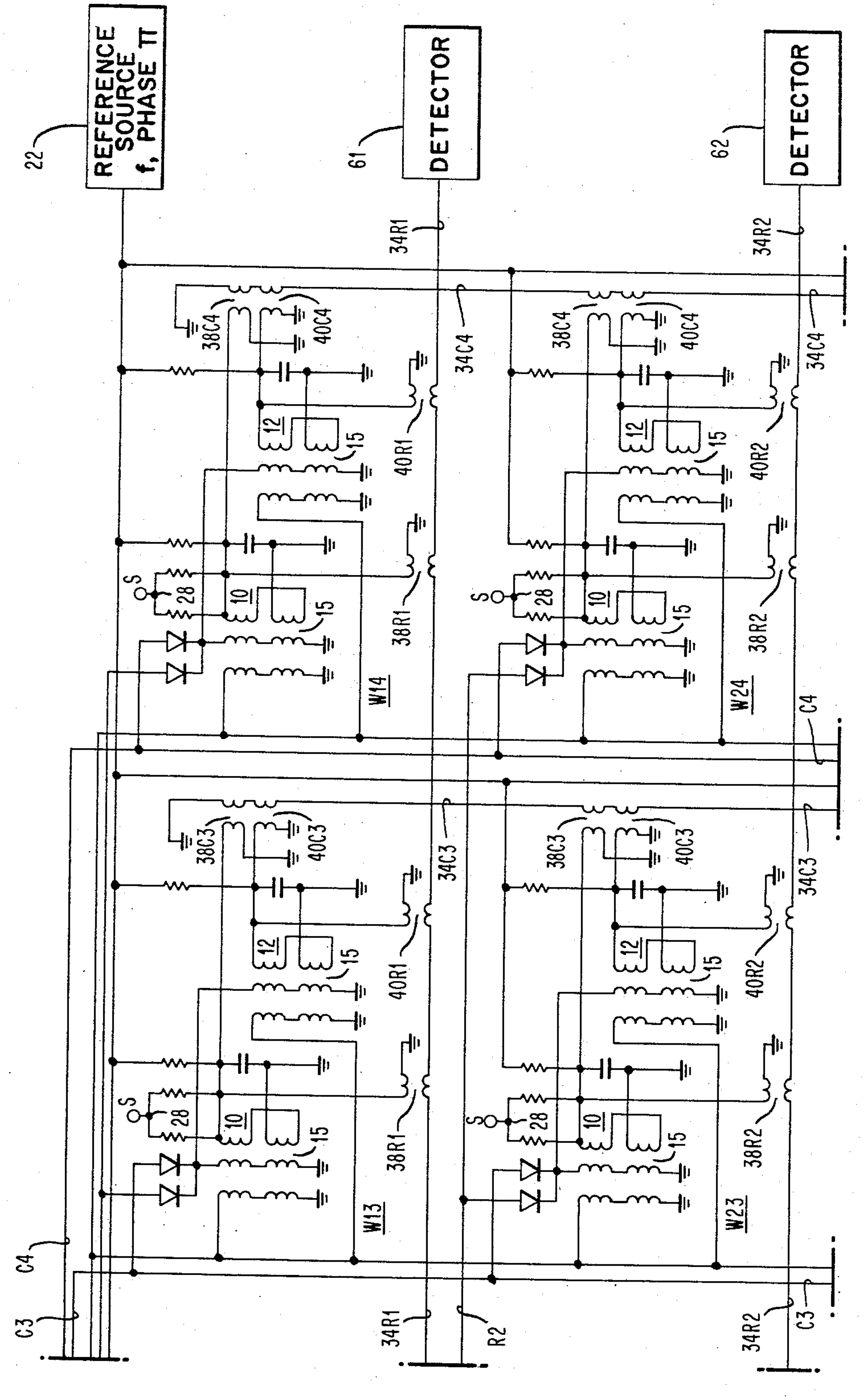
Figure 2D:
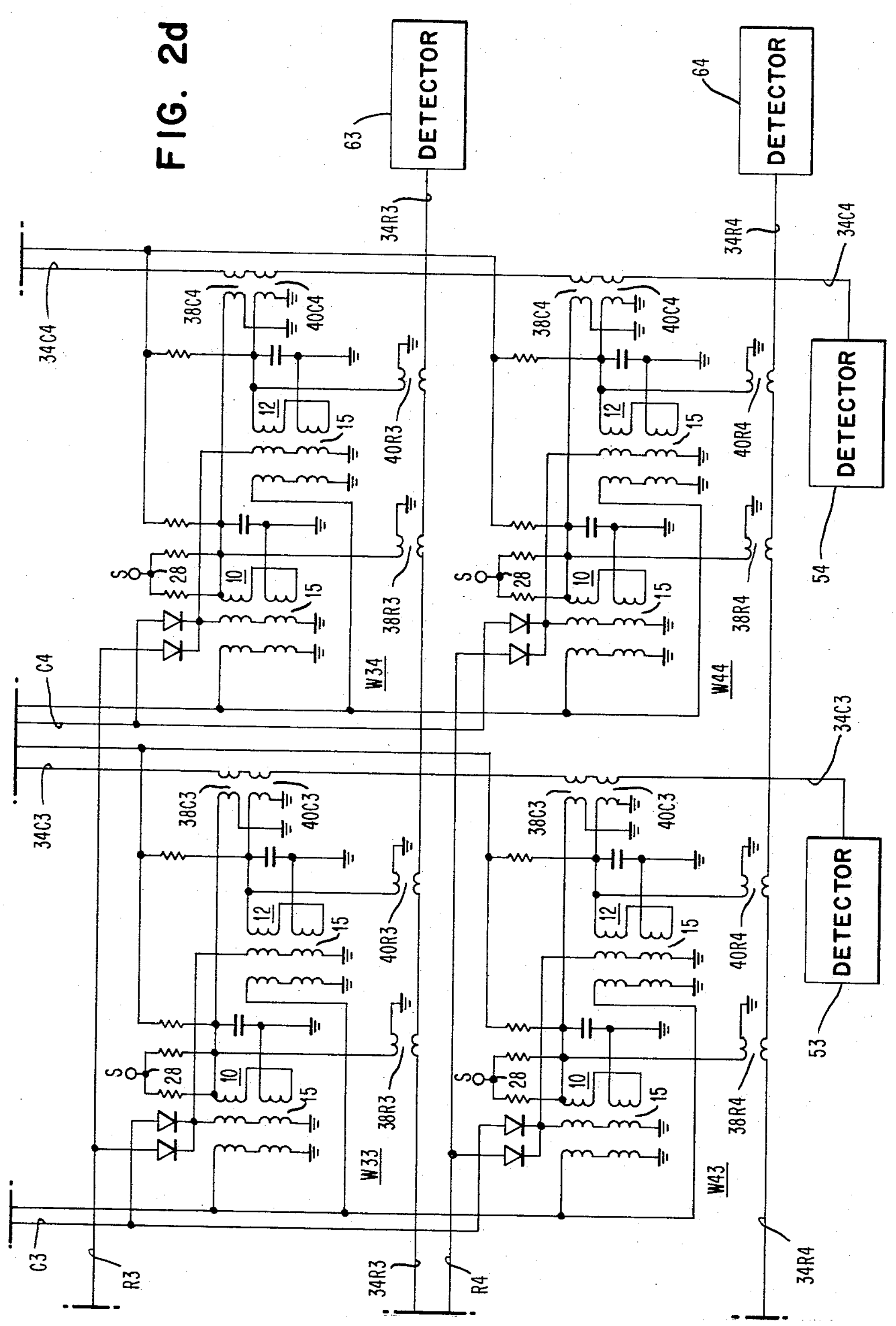

Other objects and advantages of this invention, together with its construction and mode of operation, will become more apparent from the following description when read in conjunction with the accompanying drawings, in which:

FIG. 1*a* is a diagram of one embodiment of this invention;

FIG. 1*b* is a chart which explains the electrical characteristics at various points of FIG. 1*a*; and FIG. 2 is a schematic view of another embodiment of this invention wherein a matrix arrangement of a plurality of circuits similar to that illustrated in FIG. 1*a* is utilized for detecting a plurality of signals.

The circuit illustrated in FIG. 1*a* includes a pair of parametrons 10, 12, each one including a respective inductive reactance 14, 16 and capacitive reactance 18, 20. One of the reactances of each of the parametrons 10, 12, respectively, is periodically varied in a manner so that the parametrons oscillate at a frequency $f$ at either one of two well-defined and opposite phases. The parametrons 10, 12 are "pumped" (i.e., the reactances are periodically electrically varied) by an A.C. pump circuit 13, including a bias source having an alternating current component at a frequency $2f$ superimposed upon a D.C. bias. However, other frequency relationships and D.C. biases are possible.

A reference source 22 providing a frequency $f$ having a phase $\pi$ reference is coupled by a suitable means such as a resistor 24 to the signal parametron 10, and by other suitable means as by a resistor 26 to the cancelling parametron 12. An input terminal 28 is coupled to the signal parametrons 10 by way of suitable means, for example, resistors 30, 32.

The suitable means 30, 32 is coupled to the signal parametron 10 so as to provide twice the weight as the means 24.

An output line 34, coupled at one end to a point of reference potential such as ground, and at the other end providing an output terminal 36, is coupled to the output of the signal parametron 10 (such as by way of a secondary winding of a coupling transformer 38) in series with the output of the cancelling parametron 12 (such as by way of a secondary winding on a coupling transformer 40).

Referring to both FIGS. 1*a* and 1*b*, an input signal indicates a "match" by providing a frequency $2f$ to be presented to the input terminal 28 at point A. The signal parametron 10 "ignores" the input signal and recognizes the frequency $f$ signals from the reference source 22 because the signal parametron 10, being tuned to the frequency $f$, does not accept energy from the input signal at frequency $2f$ applied to the terminal 28. In effect, the signal parametron 10, in view of the periodic variation of the impedance 14, provides amplification at the frequency $f$. The output B of the signal parametron 10 at the frequency $f$ is at either one of two phases, phase 0 or phase $\pi$. Into which one of the two phases the signal parametron 10 "locks" depends upon the phase of the locking signal applied initially thereto.

Thus, the input signal at the frequency $2f$, for a match, is applied to the input terminal 28 at the same time that the signal from the reference source 22 is applied by way of the means 24 to the signal parametron 10. The signal parametron 10, tuned to oscillate and amplify at the frequency $f$, amplifies the signal from the reference source 22 to produce an output signal B at the frequency $f$ at the reference phase $\pi$. This output signal at the frequency $f$ at the phase $\pi$ is applied to the primary winding of the transformer 38. The cancelling parametron 12 (adapted to oscillate at the frequency $f$) receives a locking signal at the frequency $f$ at the reference phase $\pi$ from the reference source 22. Hence, the cancelling parametron 12 amplifies and oscillates at the frequency $f$ at the reference phase $\pi$ and such signal C is applied to the primary winding of the transformer 40. The output line 34, having one end connected to the point of reference potential and serially connected to the secondaries of the transformer 38, 40, sums the signals B and C presented to the transformers 38, 40 and supplies the output signal D to its output terminal 36. The frequency $f$ phase $\pi$ signal B at the transformer 38 and the frequency $f$ phase $\pi$ signal C at the transformer 40 are summed; the output signal at the output terminal 36 is of high amplitude at the frequency $f$ phase $\pi$ relation.

Referring again to FIGS. 1*a* and 1*b*, an input signal A indicates a "mismatch" by providing a frequency $f$ at the reference phase 0 to be applied to the input terminal 28. The input signal A at the frequency $f$ phase 0 is applied to the signal parametron 10 coincident with the reference signal from the reference source 22 at the frequency $f$ phase $\pi$. The input signal A is coupled to the signal parametron 10 by way of the serially connected resistors 30, 32; the reference signal is applied by way of the one resistor 24 to the signal parametron 10. Of the two signals applied to the signal parametron 10, the signal at the frequency $f$ phase 0 carries twice the weight as that of the frequency $f$ phase $\pi$. The three resistors 30, 32, 24 act as a majority circuit. Hence, the signal at phase 0, carrying greater weight, causes the signal parametron 10 to "lock in" and oscillate at the frequency $f$ phase 0. As before, the cancelling parametron 12 oscillates at the frequency $f$ at the phase $\pi$. Thus, the output line 34, which is coupled at one end to a point of reference potential and at the other end to the output terminal 36, serially receives the signal B at frequency $f$ phase 0 (via the transformer 38) and the signal C at the frequency $f$ phase $\pi$ (via the transformer 40). These two signals B and C, being substantially the same amplitude, effectively cancel one another, whereby no output signal D is provided to the output terminal 36.

As a modification, the cancelling parametron 12 can be substituted by a reference oscillator which oscillates at the frequency $f$ phase $\pi$. However, in view of the relatively low cost of a parametron, together with the advantages inherent therein, the preferred embodiment of the invention utilizes a pair of parametrons as described hereinabove.

The output of an associative store (which is a signal at the frequency $2f$ for a match and a signal at the frequency $f$, phase 0 for a non-match) is introduced as an input signal to the tank circuit of the signal parametron 10 which is tuned to oscillate at the frequency $f$. This input signal is given a weight of 2 and the reference signal at frequency $f$ phase $\pi$ is given a weight of 1. Thus, an input signal, indicative of a non-match causes the signal parametron 10 to oscillate at the phase 0. With an input signal at the frequency $2f$ (indicative of a "match"), the reference signal is effective in locking the signal parametron so that it oscillates at the phase $\pi$. The output of the signal parametron 10 is coupled in series with the output of the cancelling parametron 12 oscillating at reference phase $\pi$ so that the output signal at the terminal 36 is at substantially zero amplitude for a "mismatch," and is at double normal amplitude at frequency $f$, phase $\pi$ for a "match" condition.

FIG. 2 illustrates a matrix and means for decoding from the matrix the signal from a plurality of word locations, each location having an individual pair of signal and cancelling parametrons. FIG. 2 includes a plurality of circuits, similar to that shown in FIG. 1*a*, arranged in a matrix wherein the input signal at the frequency $2f$, or at the frequency $f$ phase 0, is separately provided for each circuit from a respective block S, and is coupled to the corresponding input terminal 28. Each of the signal and cancelling parametrons for the various word locations are provided with a set of saturating windings 15 for disabling signals from nonselected word locations. A column output line 34C1 is serially coupled to the output parametron 10 and the cancelling parametron 12 of each of the word locations W11, W21, W31, W41 of the left hand column. A row output line 34R1 is serially coupled to the signal parametron 10 and cancelling parametron 12 of each of the word locations W11, W12, W13, W14 of the upper row. The column line 34C1 is coupled to the parametrons 10, 12 of the upper left word location W11 by way of a transformer winding 38C1 and 40C1, respectively; the column line 34C1 is coupled to the parametrons for remaining locations W21, W31, W41 of the left column by respective windings 38C1, 40C1. In a similar manner, other column output lines 34C2, 34C3, and 34C4 are coupled to their respective memory locations by way of a respective set of column pairs of windings 38C2, 40C2, 38C3, 40C3; and 38C4, 40C4; respectively.

The row line 34R1 is coupled to the various memory locations for the upper row by way of respective transformer windings 38R1 and 40R1 to the signal parametron 10 and cancelling parametron 12, respectively, for each of the memory locations W11, W12, W13, W14 of the upper row. The other row lines 34R2, 34R3, 34R4, for the second, third, and fourth rows, are coupled to the various memory locations at each row by way of respective transformers 38R2, 40R2; 38R3, 40R3; and 38R4, 40R4, respectively. The outputs of the column lines 34C1, 34C2, 34C3, 34C4 are coupled to respective detectors 51, 52, 53, 54; the outputs of the row lines 34R1, 34R2, 34R3, 34R4 are coupled to respective detectors 61, 62, 63, 64, respectively.

Decoding is accomplished by detecting the wires of each orthogonal set which has an output condition. Such detection is accomplished by a suitable rectifier circuit or detector.

A single match for a word location results in one line of the horizontal set and one line of the vertical set having an output condition. The remaining lines are at a zero amplitude output. An output signal on one line of the horizontal set and one of the vertical set completely defines one particular memory location.

Although only two sets, horizontal and vertical, are illustrated in FIG. 2, it is contemplated that arrangements for three or more orthogonally disposed sets can be provided by increasing the couplings to the signal and cancelling parametrons 10 and 12, respectively, for each word location. Hence, orthogonally disposed sets in the X, Y and Z direction are within the scope of this invention.

Each of the memory locations are illustrated schematically and referred to by the reference letters W11, W12, W13, W14 for the upper row, respectively, and W21, W22, W23, W24 for the next row, etc.

When more than one match occurs in the associative store, an ambiguity arises when several detectors are sensed in one of the horizontal and vertical sets illustrated in FIG. 2. For example, a "match" at each of the two locations W22 and W23 are not definitely defined by detecting the horizontal lines and vertical lines at the detectors 62, 63 and 52, 53. The output signals present at the detectors 62, 63, 52, 53 may indicate a "match" at locations W22, W23, W32, W33, or W22, W23, W33 only, or W22, W32, W33 only, or W22, W33, only or W23, W32, W33 only, or W23, W32, only. In order to eliminate such a possible ambiguity, it is desirable to decode separately among the word parametrons for the various memory locations. Such a decoding scheme is illustrated, by way of example, in FIG. 2 which further illustrates four flip-flop circuits FF–C1, FF–C2, FF–R1, and FF–R2. The one and zero outputs of these four flip-flops are coupled in a manner to provide sixteen different possible combinations which include two individual sets of four lines each, one line from each set being coupled via suitable diodes to saturating windings 15 on the parametrons 10, 12 for a word location, respectively. Direct curent applied to the selected sets causes the parametrons to cease to oscillate for the undesired memory locations.

The selective coding scheme can be effected by (1) selectively turning the D.C. pump on or off, (2) selectively turning the A.C. pump on or off, and (3) as illustrated in FIG. 2, selectively saturating a special parametron winding 15 so the parametron fails to oscillate. A parametron usually requires both A.C. and D.C. pump to properly operate; if either of the two are missing, the parametron does not oscillate. However, the use of a special parametron winding, as illustrated in FIG. 2, saturates the parametron and preventing it from oscillating when direct current is applied to the special winding. Thus, by any of the three aforesaid techniques, an output results in a zero amplitude from the respective parametrons. Such a zero output occurs regardless of the input signal and indicates a mismatch; or more precisely, an ignore or "don't-care" situation. And, by arranging the manipulative technique in a binary fashion throughout the parametrons, it is possible to decode so that multiple bits can be resolved. As illustrated in FIG. 2, four flip-flops are used for decoding 16 parametron amplifiers. Selective exercise for all four flip-flops permits three of the four column lines 34C1, 34C2, 34C3, 34C4 and three of the four row lines 34R1, 34R2, 34R3, 34R4 to carry disabling saturating voltage levels. One column line and one row line is free of disabling voltage levels so that only one signal parametron and one cancelling parametron for only one memory location respond to a "match" condition, at a time. All other locations are at a zero indication.

When all of the flip-flops are de-activated and providing no disabling levels on their output terminals, and when only one of the row detectors 61, 62, 63, 64 and only one of the column detectors 51, 52, 53, 54 provides an output signal, then it is known that only the corresponding memory location provides the "match" condition. When several column or row detectors are energized, creating the ambiguity described above, then one flip-flop at a time can be energized which places half of the parametrons in a "don't care" state, the other half ready for detection. Selective and successive exercise of the remaining flip-flops cause the "don't care" state to be imposed in a known pattern on the associative store, in order to determine the multiple bits. Thus, energization of one flip-flop at a time may cause the detection states of the column and row detectors to be definitive.

The embodiments of the invention in which an exclusive property or privilege is claimed are defined as follows:

1. In combination,
a first parametron adapted to oscillate at a frequency $f$ at either a phase 0 or a phase $\pi$ mode;
a second parametron adapted to oscillate at said frequency $f$ at either said phase 0 or said phase $\pi$ mode;
a reference source of oscillations at said frequency $f$, phase $\pi$ mode;
means coupling said reference source to said second parametron to cause second parametron to oscillate in said phase $\pi$ mode;
means for receiving an input signal of one of two different types of signals, one of said types being a signal at a frequency $2f$, the other of said types being a signal at said frequency $f$ at said phase 0 mode;
means coupling said reference source to said first parametron with a weight of one;
means coupling said receiving means to said first parametron with a weight of two,
whereby said first parametron is caused to oscillate in said phase $\pi$ mode when said input signal is a signal at said frequency $2f$, and whereby said first parametron is caused to oscillate in said phase 0 mode when said input signal is a signal at said frequency $f$, phase 0 mode; and
an output circuit coupled to said first and second parametron, said output circuit providing an output signal at said frequency $f$ when said input signal is at said frequency $2f$, and providing an absence of an output signal when said input signal is at said frequency $f$.

2. The invention as claimed in claim 1 further including a rectifier circuit coupled to said output circuit.

3. A frequency logic circuit comprising
means for receiving an input signal, said signal being one of two different types, one type being a signal at a frequency $f$ at a phase 0 mode of oscillation, the other type being a signal at a frequency $2f$;
a reference source of oscillations at said frequency $f$ at a phase $\pi$ mode of oscillation;
a first tuned circuit resonant of said frequency $f$;
means coupling said reference source to said tuned circuit;
means coupling said receiving means to said tuned circuit,
whereby said first tuned circuit is caused to oscillate at said frequency $f$ in said phase $\pi$ mode when said input signal is a signal at said frequency $2f$, and whereby said first input tuned circuit is caused to oscillate at said frequency $f$ in said phase 0 mode when said input signal is a signal at said frequency $f$, phase 0 mode;
a second tuned circuit resonant at said frequency $f$;
means coupling said reference source to said second tuned circuit; and
an output circuit coupled to said first and second tuned circuits.

4. In combination,
an input source adapted to selectively provide a first signal at a frequency $f$ at one phase or a second signal at frequency $2f$;
a reference source of oscillations at said frequency $f$;
a combining network, coupled to said sources;
said reference source and said input source being coupled to said network, whereby when said first signal is present in an opposing manner the signals at said frequency $f$ are cancelled;
a tuned circuit coupled to said sources,
said tuned circuit being effective when said second signal is present to cancel signals at said frequency $2f$; and
output means coupled to said network and said tuned circuit.

No references cited.

ARTHUR GAUSS, *Primary Examiner.*

B. P. DAVIS, *Assistant Examiner.*